US007512672B2

(12) United States Patent
Hightower et al.

(10) Patent No.: US 7,512,672 B2
(45) Date of Patent: Mar. 31, 2009

(54) METHOD AND SYSTEM FOR DOMAIN NAME RESOLUTION IN A COMMUNICATIONS SYSTEM

(75) Inventors: Michael Hightower, San Jose, CA (US); James Pickering, Leander, TX (US); Akkampapet Sundarraj, Cupertino, CA (US)

(73) Assignee: Gigaset Communications GmbH, Munich (DE)

( * ) Notice: Subject to any disclaimer, the term of this patent is extended or adjusted under 35 U.S.C. 154(b) by 817 days.

(21) Appl. No.: 11/021,785

(22) Filed: Dec. 22, 2004

(65) Prior Publication Data

US 2005/0210139 A1 Sep. 22, 2005

Related U.S. Application Data

(60) Provisional application No. 60/554,492, filed on Mar. 19, 2004.

(51) Int. Cl.
*G06F 15/16* (2006.01)
(52) U.S. Cl. ...................... 709/219; 709/227; 709/233; 709/245; 713/1
(58) Field of Classification Search ................. 709/219, 709/227, 233, 245; 713/1
See application file for complete search history.

(56) References Cited

U.S. PATENT DOCUMENTS

| 6,256,671 | B1 * | 7/2001 | Strentzsch et al. | 709/227 |
| 6,892,245 | B1 * | 5/2005 | Crump et al. | 709/245 |
| 6,968,389 | B1 * | 11/2005 | Menditto et al. | 709/233 |
| 7,003,555 | B1 * | 2/2006 | Jungck | 709/219 |
| 2004/0073707 | A1 * | 4/2004 | Dillon | 709/245 |

* cited by examiner

*Primary Examiner*—Jinsong Hu
(74) *Attorney, Agent, or Firm*—The Nath Law Group; Jerry L Meyer; Derek Richard

(57) ABSTRACT

A method and system for domain name resolution in a communications network including the steps of intercepting communication to and from the network and replacing DNS primary and DNS secondary IP address by an interceptor program. The interceptor program copies then replaces the IP addresses in messages received from the network to a spoof address so that an alternate application will receive the domain name resolution requests. The interceptor program replaces the IP addresses in messages sent to the network from the spoof address to the copied addresses. The alternate application receives the domain name resolution request and replaces the IP address of the request which is the spoof address to the copied IP addresses. The alternate application sends the domain name resolution requests to the copied IP addresses operatively simultaneously.

24 Claims, 5 Drawing Sheets

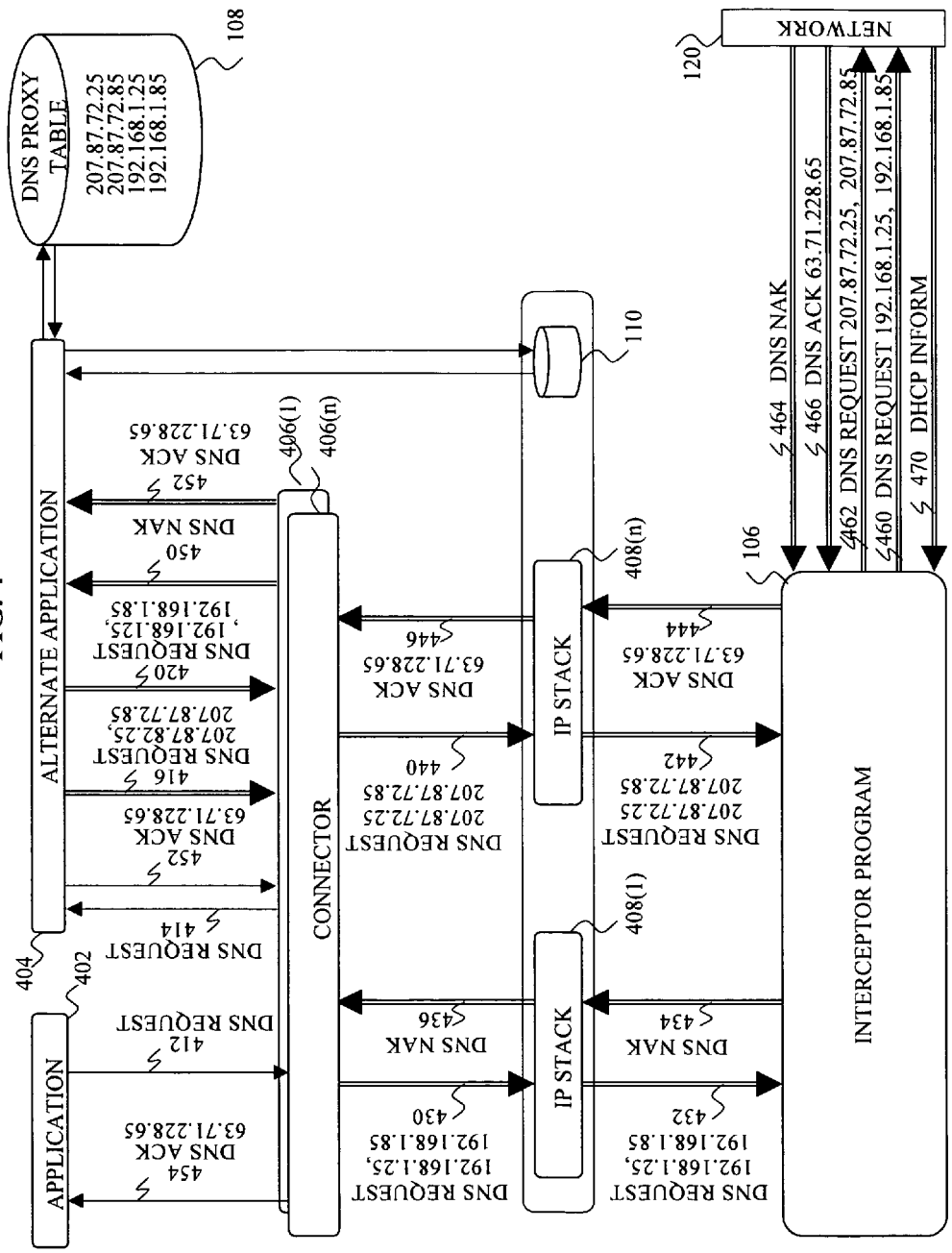

METHOD AND SYSTEM FOR DOMAIN NAME RESOLUTION IN A COMMUNICATIONS SYSTEM

CROSS-REFERENCE TO RELATED APPLICATIONS

This application claims priority to U.S. Provisional Patent Application Ser. No. 60/554,492, filed Mar. 19, 2004, which is incorporated by reference herein in its entirety.

FIELD OF INVENTION

The present invention relates to communications systems and more particularly to domain name resolution.

BACKGROUND OF THE INVENTION

The IP (Internet Protocol) defines the format for the addresses and packets used within the Internet. An IP address is easily readable by an IP network; however, it is difficult for most humans to remember. A symbolic name called a domain name, such as "uspto.gov", is easier to remember and is more meaningful to a human. The domain name has a corresponding IP address that can be retrieved from a DNS (Domain Name Service). Domain name resolution is the process of converting the domain name to an IP address.

The number of domain names is too large to maintain on a single computer and is therefore distributed amongst computers known as DNS servers. Since the database is distributed, a DNS server may not have the information required to resolve the IP address. Thus another server may need to be polled. In some cases the DNS server does not even respond to the request, for example, if the DNS server was not operational. For a data processing system that polls the DNS servers sequentially, sometimes the domain name resolution is not resolved by the first request DNS server polled. This may slow down the domain name resolution process. This slow down is particularly noticeable when multiple sessions, such as multiple WAN interfaces, are active on the data procession system. This is because there are potentially more domain name servers to send the domain name resolution request and increases the possibility that the first DNS server polled cannot resolve the request.

SUMMARY OF THE INVENTION

An exemplary method consistent with the present invention is presented in one aspect by a domain name resolution request in a communications system, wherein the communication system comprises a data processing system and a network. The method comprises initializing a PPP (Point-To-Point Protocol) connection between the data processing system and the network for establishing a session. During the initialization, an IPCP (Internet Protocol Control Protocol) message containing a DNS (Domain Name Service) server address and being communicated between the data processing system and the network is intercepted. A DNS server address is copied from the IPCP message and stored. The DNS server address is then replaced with an alternative address. The domain name resolution request is intercepted and sent to stored addresses substantially simultaneously to the network. The resolved IP address is received by the data processing system.

An exemplary system for resolving a domain name resolution request, consistent with the present invention is presented in one aspect comprising a data processing system and a network. An IPCP message containing a DNS server address is communicated between the data processing system and the network during a PPP initialization. The message is intercepted and the DNS server address is copied from the IPCP message and stored. The DNS server address in the message is replaced with an alternative address. A domain name resolution request is intercepted prior to sending request to the network.

BRIEF DISCRIPTION OF THE DRAWINGS

The invention is explained in more detail by way of example with reference to the following drawings:

FIG. 4 illustrates a domain name resolution process consistent with an exemplary embodiment of the present invention.

DETAILED DESCRIPTION OF THE INVENTION

The term "operatively connected" as used herein means connected by any communications channel, including but not limited to wire, optical, or wireless. The term "program" means any application, driver, or operating system, or combination of thereof. The term "message" means a unit of data, including but not limited to a packet, or datagram. The term "negative acknowledgment" message can include a message with an explicit negative response code or identifier, an unexpected message response or a timeout. For the purposes of illustration, the negative acknowledgment is shown as a message with an explicit negative response code.

The present invention will now be described more fully with reference to the accompanying drawings in which exemplary embodiments of the invention are shown. However, this invention may be embodied in many different forms without departing from the spirit and scope of the invention. The drawings are provided so that this disclosure will be thorough and complete and should not be taken as a limiting the scope of the invention. For the purpose of illustration, specific IP (Internet Protocol) addresses are used; however, the invention is not limited to these addresses.

Figure 1:
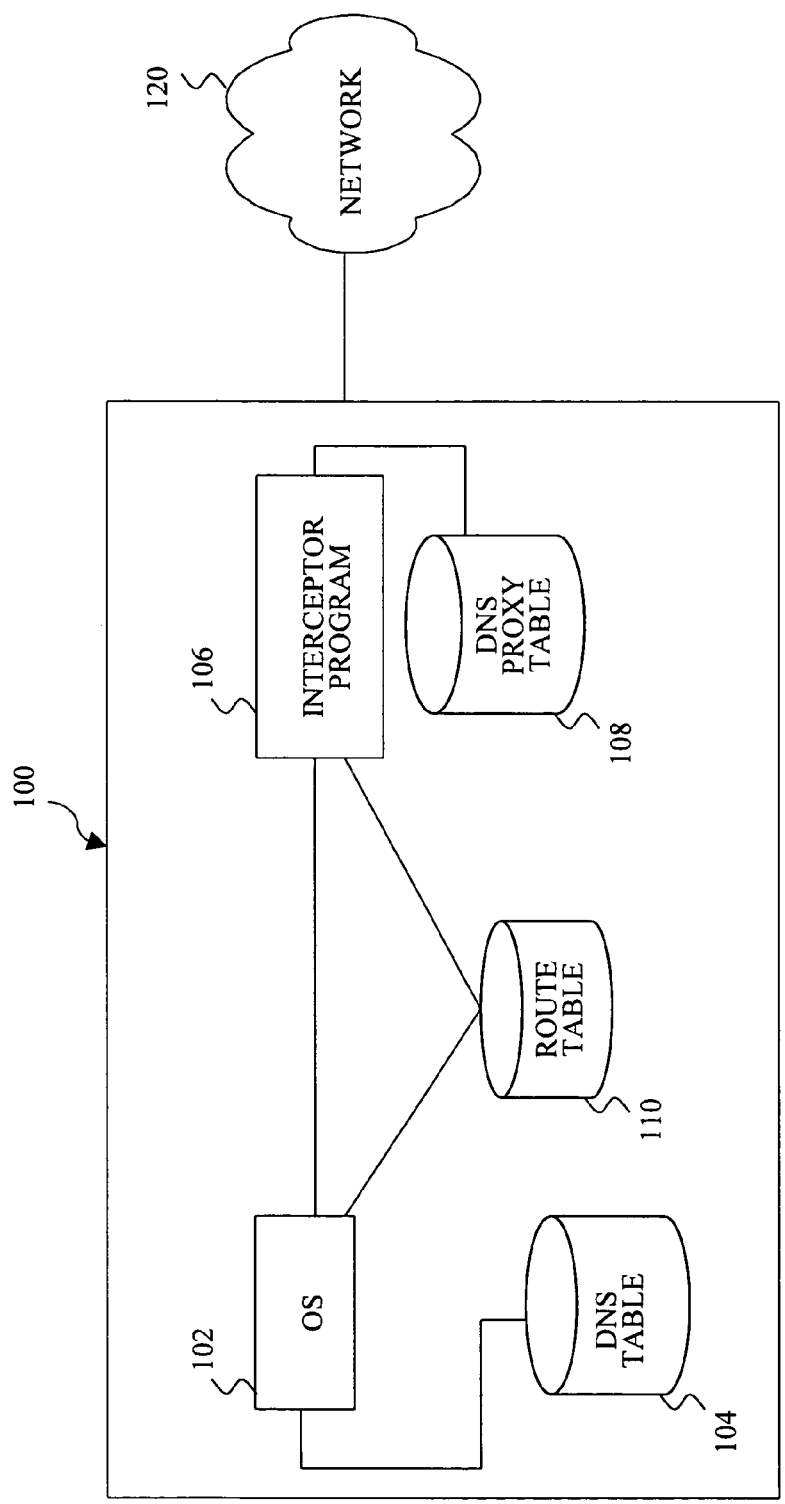
FIG. 1 illustrates a data processing system of an exemplary embodiment of the present invention.

FIG 1 shows a communication network including a data processing system 100 operatively connected to a network 120, such as an ATM (Asynchronous Transfer Mode) network. The data processing system 100, may be any hardware or software or combination of the two, such as a home computer. The data processing system 100 includes an OS (operating system) 102 and a interceptor program 106. The OS 102 manages programs running in the data processing system 100 and controls the PPP (Point-to-Point Protocol) communication for the data processing system 100. The data processing system also includes a DNS (Domain Name Service) table 104, which contains IP addresses visible to the system. The data processing system 100 also includes a DNS proxy table 108 and a route table 110. The DNS proxy table 108 contains IP addresses used for domain name resolution. The route table facilitates intelligent routing of the domain name resolution requests.

Figure 2:
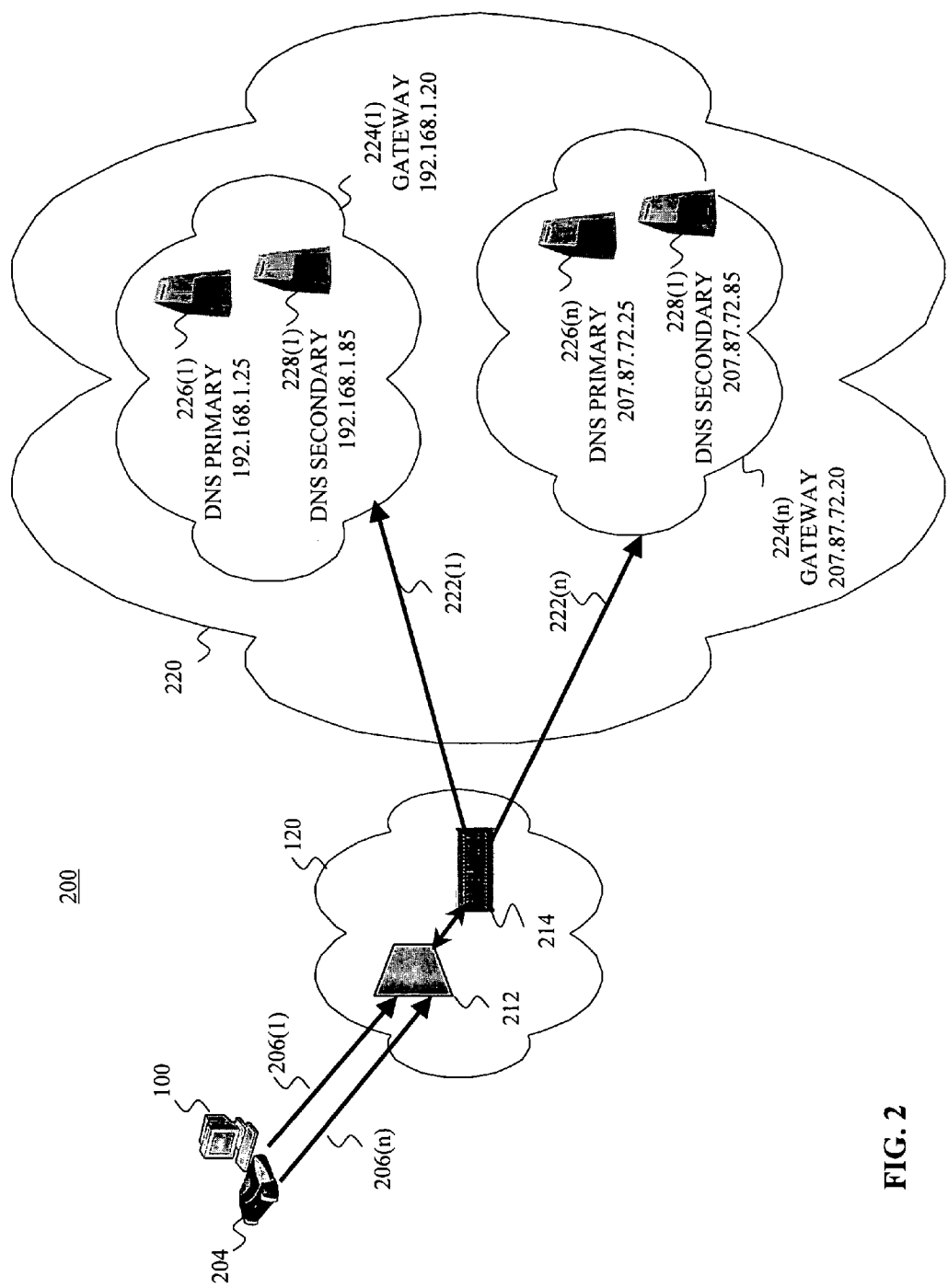
FIG. 2 illustrates a communication system consistent with an exemplary embodiment of the present invention.

FIG. 2 shows the communication system 200 including, the network 120, and an IP network 220. The communication system 200 illustratively includes the data processing system 100 connected to a broadband modem 204. The modem 204 is a hardware device, software program or combination thereof for modulating signals for transmission over a transmission medium to a remote site, and demodulating signals received through the medium from a remote site such as the network 120.

In an exemplary configuration, the network 220 contains a multiplexer 212 and an aggregator 214, such as a BRAS (Broadband Remote Access Server). The multiplexer 212 allows many transmission medium connections to a single access in the network 120. The aggregator 214, which is operatively connected to the multiplexer 212, facilitates transmission to and from the IP network 220.

The aggregator 214 is the termination point for the gateway IP address. The aggregator 214 will route the session data according to its internal configuration to the correct IP Network 222. For the purpose of simplifying the discussion we show the gateway address 224 in the IP network 220.

The IP network 220 includes an ISP (Internet Service Provider) connection 222. Each ISP connection 222 has access to a gateway 224 accessing a DNS primary server 126 and a DNS secondary server 128. FIG. 2 shows the gateway 224(*l*) has an IP address of 192.168.1.20, the DNS primary server has an IP address of 192.168.1.25 and a DNS secondary server has an IP address of 192.168.1.85. FIG. 2 also shows the gateway 224(*n*) has an IP address of 192.168.1.20, the DNS primary server having an IP address of 192.168.1.25 and a DNS secondary server has an IP address of 192.168.1.85.

The data processing system 100 connects to the network 120 via a session 206. The number of sessions allowed is dependent on hardware, software or combination thereof contained within the data processing system 100. The session 206(*l*) and session 206(*n*) both may operatively connect to the ISP connection 222(*l*). Alternatively, the session 206(*l*) may operatively connect to the ISP connection 222(*l*) and the session 206(*n*) operatively connect to a different ISP connection 222(*n*).

Figure 3:
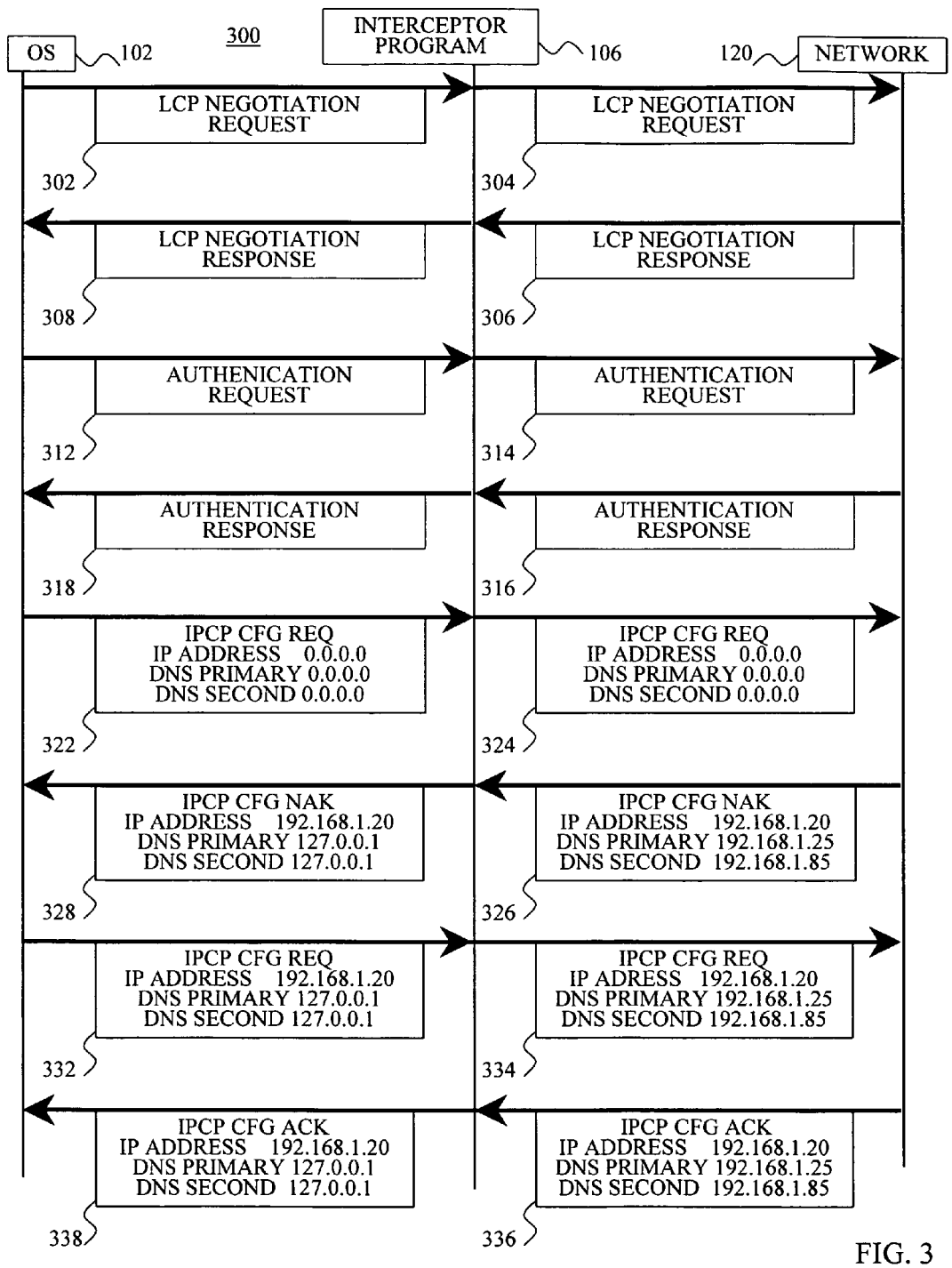
FIG. 3 illustrates an initialization consistent with an exemplary embodiment of the present invention.

FIG. 3 illustrates a PPP initialization 300 including message flows to and from the OS 102, the interceptor program 106, and the network 120. The messages are intercepted by the interceptor program 106 and some of the messages are modified by the interceptor program 106. The messages are then forwarded by the interceptor program 106 to the original destination. The PPP initialization includes an LCP flow, an authentication flow and an IPCP flow.

LCP Flow

An LCP (Link Control Protocol), which is a subset of PPP, checks the identity of devices and determines the acceptable message size for transmission. Additionally, LCP establishes, configures, and tests data-link Internet connections. An LCP negotiation request message 302 is sent by the OS 102 and is intercepted by the interceptor program 106. The interceptor program 106 forwards the LCP negotiation request message 304 to the network 120. The network 120 sends an LCP negotiation response message 306, which is received by the interceptor program 106. The interceptor program forwards the LCP negotiation response message 308 to the OS 102.

Although FIG. 3 shows an LCP flow as one set of LCP messages 302, 304, 306, and 308 it is not limited to one set of LCP messages 302, 304, 306, and 308 as would be recognized by one skilled in the art. The LCP flow is shown to clarify that the LCP messages 302 sent by the OS 102 are intercepted by the interceptor program 106 and not modified prior to forwarding to the network 120. Likewise, the LCP messages 306 sent by the network 120 are intercepted by the interceptor program 106 and not modified prior to forwarding to the OS 102.

Authentication Flow

Authentication is a method of determining whether someone or something is, in fact, who or what it is declared to be. An authentication request message 312 is sent by the OS 102 and intercepted by the interceptor program 106. The interceptor program 106 forwards the authentication request message 314 to the network 120. The network 120 sends an authentication response message 316, which is received by the interceptor program 106. The interceptor program 106 forwards the authentication response message 318 to the OS 102.

Although FIG. 3 shows an authentication flow as one set of authentication messages 312, 314, 316, and 318 it is not limited to one set of authentication messages 312, 314, 316, and 318 as would be recognized by one skilled in the art. The authentication flow is shown to clarify that the authentication messages 312 sent by the OS 120 are intercepted by the interceptor program 106 and not modified prior to forwarding to the network 120. Likewise, the authentication messages 316 sent by the network 120 are intercepted by the interceptor program 106 and not modified prior to forwarding to the OS 102.

IPCP Flow

The OS 102 sends an IPCP (Internet Protocol Control Protocol) CFG (configuration) request message 322 including an invalid IP address, an invalid DNS primary IP address and an invalid DNS secondary IP address. The IPCP CFG messages provide a method for the data processing system 100 to learn what DNS servers are available. An invalid IP address, such as 0.0.0.0, indicates that the data processing system 100 does not know what address to use. An IPCP CFG request message 322 is received by the interceptor program 106. An IPCP CFG request message 324 is forwarded to the network 120.

The network 120 sends an IPCP NAK (negative acknowledgement) message 326 which is received by the interceptor program 106. The message 326 includes the IP addresses of the gateway, the DNS Primary server, DNS secondary server that the network is suggesting for use. The interceptor program 106 intercepts the message 326, copies the DNS primary IP address and DNS secondary IP addresses in the DNS Proxy Table and modifies the DNS primary and secondary IP addresses to a spoof address. The spoof address is an alternate address to the real address. In this example the spoof address is the local host address (127.0.0.1) but any valid IP address may be used. The spoof address may be a fixed value or it may be administrable. An IPCP CFG negative acknowledgement message 328, including the valid IP address, a DNS primary spoof address, and a DNS secondary spoof address is sent from the interceptor program 106 to the OS 102.

Figure 3B:
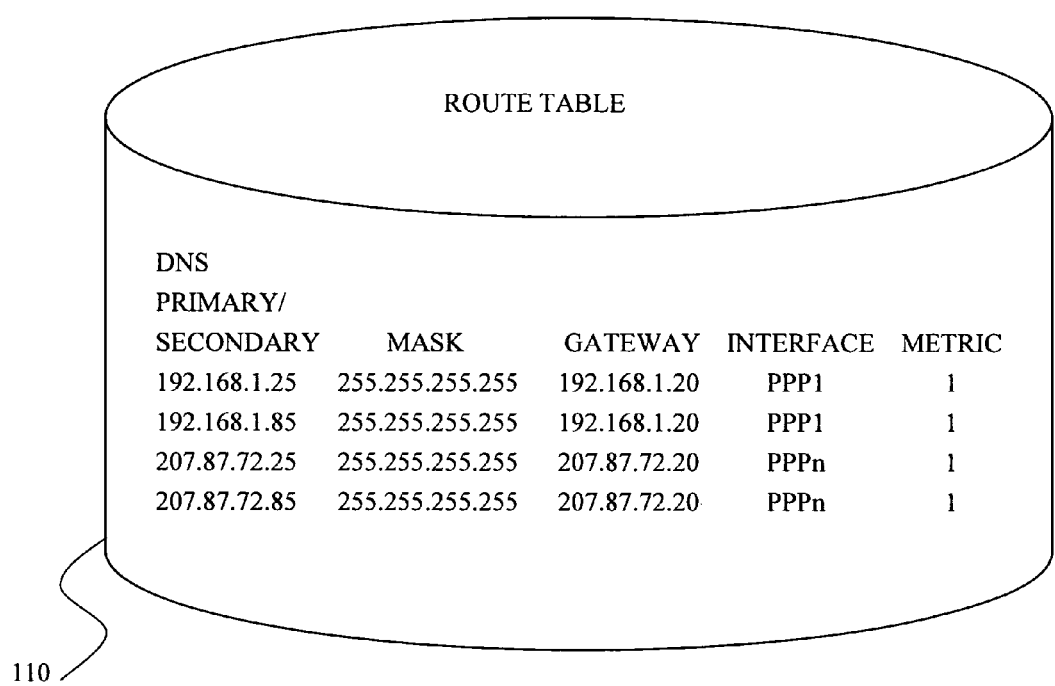
FIG. 3b illustrates entries that would be added to a system route table consistent with an exemplary embodiment of the present invention.

Referring to FIG. 3b the route table 110 includes a DNS primary/secondary IP address, a mask, a gateway IP address, an interface and a metric. In an exemplary embodiment of the invention, the host entries for the DNS primary and secondary IP addresses are stored in the route table 110 to facilitate intelligent routing. The IP addresses of the DNS primary 226 and the DNS secondary 228 are copied from the IPCP message 326 into the primary/secondary field of the route table 110. The current session 206 is used to determine the interface value. The mask will be 255.255.255.255 to create a host entry in the table. The metric is used to determine which entry to use when there are multiple entries for an IP address. The lower the number in the metric the higher the priority. For this reason one is generally used for higher priority. This example shows the DNS primary/secondary IP addresses of 192.168.1.25 and 192.168.1.85 using interface PPP1 and the DNS primary/secondary IP addresses of 207.87.72.25 and 207.87.72.25 using interface PPPn.

Referring to FIG. 3, The OS 102 sends an IPCP CFG request message 332 using the data received in an IPCP CFG acknowledgment message 328, which is received by the interceptor program 106. The interceptor program 106 replaces the DNS primary and secondary spoof addresses with the addresses stored in the DNS proxy table 108 and sends an IPCP CFG request 334 including the replaced addresses to the network 120.

The network 120 confirms the addresses and sends an IPCP CFG acknowledgement message 336 which is received by the interceptor program 106. The interceptor program 106 modifies the DNS primary and secondary addresses to the spoof address and sends an IPCP CFG acknowledgement message 338 to the OS 102. This acknowledgment indicates to the OS 102 that the DNS negotiation is complete.

FIG. 4. illustrates a domain name resolution consistent with an exemplary embodiment of the invention. An application 402 is operationally attached to a connector 406 such as a socket, for handling a domain name resolution request 412. The domain name resolution request 412 includes a symbolic address such as "uspto.com" and the IP address of the DNS server to handle the request. An alternate application 404, knows the spoof address. The spoof address is used to route messages to the alternate application 404. The alternate application 404 listens on a well known port at the spoof address for the establishment of the connection from the application 402 and receives the request 414. The alternate application 404 accesses the DNS proxy table 108 to get the IP addresses of the DNS primary (192.168.1.25, and 207.87.72.25) and DNS secondary (192.168.1.85, and 207.87.72.85) servers to send the request.

In an exemplary embodiment of the invention, the route table 110 is queried by the data processing system 100 on how to intelligently route the domain name resolution request messages. Intelligent routing involves sending the domain name resolution only to the gateway 224 that has access to the DNS IP address. The route information is used to send requests on the sessions that are operatively connected to the gateway that contains the DNS IP address. For this example, domain name resolution request at IP address 192.168.1.25 and 192.168.1.85 are sent on the session 206(*l*). Additionally, domain name resolutions request at IP address 207.87.72.25 and 207.87.72.25 are sent in the session 206(*n*).

When explicit routes for each DNS server entry are not added to the route table 110 the data processing system 100 may send the request through a network path that has less than optimum or possible has no access to the DNS server which might result in unwanted traffic.

The alternate application as illustrated in FIG. 4 establishes a connection to a connector 406 to enable sending domain name resolution requests 416 and 420. This may be a single connection or multiple connection based on the domain name resolution requests 416 and 420. The connection enables the domain name resolution requests 430 and 440 to be sent to an IP stack 408. The number of domain name resolution requests sent is based on how many sessions have been established 206, how many IP address have been learned and stored in the DNS proxy table 108, and if intelligent routing from the route table 110 is used. The message such as 416 with multiple arrows, illustrate that the message may be one or more messages.

FIG. 4 shows the domain name resolution request 430 routed to the IP stack 408(*l*) and the domain name resolution request 440 routed to the IP stack 408(*n*); however, the request 430 and the request 440 may be routed to the same IP stack 408(*l*). Illustrating the sending of the domain name resolution requests 430 and 440 to different IP stacks 408(*l*) and 408(*n*) helps to show the separate sessions 206(*l*) and 206(*n*) when using intelligent routing. However, the domain name resolution requests 430 and 440 may be to the same stack 408(*l*) and 408(*n*) even when multiple sessions 206 are used.

The interceptor program 106 intercepts a domain name resolution request 432 sent from the IP stack 408(*l*) and a domain name resolution request 442 sent from the IP stack 408(*n*). The interceptor program 106 forwards a domain name resolution request 462 and a domain name resolution request 460 to the network 120. In an exemplary embodiment of the invention, the interceptor program 106 and alternate application 404 are separate programs. However, someone skilled in the art would recognize that these programs may be combined into one program or further separated into more programs.

Once the domain name resolution requests 460, 462 are sent to the network 120, the data processing system 100 waits for acknowledgements. A negative acknowledgement such as 464 from the network 120 is intercepted by the interceptor program 106. A negative acknowledgement 434 from the interceptor program 106 is routed back through the IP stack 408(*l*). The IP stack 408(*l*) sends a negative acknowledgement 436 to the connector 406(*n*) which routes a negative acknowledgement 450 to the alternate application 404. The alternate application 404 ignores the negative acknowledgment 450.

A positive acknowledgement 464 including the resolved IP address is sent by the network 120 The interceptor program 106 receives the positive acknowledgement 464 and sends a positive acknowledgment 444 to the IP stack 408(*n*). The IP stack 408(*n*) sends a positive acknowledgment 446 to the connector 406(*n*) which routes a positive acknowledgement 452 to the alternate application 404. The alternate application 404 sends a positive acknowledgment 456 to the connector 406(*l*) which routes a positive acknowledgment 454 to the application 402. The alternate application 404 only forwards the first positive acknowledgment to the application 404 for a domain name resolution request 414. Subsequent positive acknowledgements are discarded.

DHCP (Dynamic Host Control Protocol) allows the data processing system 100 to receive a dynamic IP address to identify it to the network 120. Once the session 206 is established all unsolicited DHCP inform messages 470 are intercepted by the interceptor program 106 and discarded by the interceptor program 106.

We claim:

1. A method for resolving a domain name resolution request in a communications system including a data processing system, and a network, comprising:

initializing a PPP (Point-To-Point Protocol) connection between the data processing system and the network for establishing a session;

during said initialization intercepting an IPCP Internet Protocol Control Protocol message containing a DNS (Domain Name Service) server address by an interceptor program, the IPCP message communicated between the data processing system and the network;

copying said DNS server address from said IPCP message, storing said copied DNS server address, and replacing said DNS server address in the IPCP message with an alternative address;

resolving said domain name resolution request by intercepting said request by an alternate application;

substantially simultaneously sending the request to each DNS server for which an address was stored; and receiving a resolved IP address by said data processing system.

2. The method as claimed in claim 1, wherein the step of initializing a PPP connection further comprising adding intelligent routing information to a route table.

3. The method as claimed in claim 2, further comprising copying the DNS server address into the route table for intelligent routing.

4. The method as claimed in claim 2, further comprising entering in the route table a metric value of 1 for indicating high priority.

5. The method as claimed in claim 2, further comprising entering in the route table an interface for the DNS server address for identifying a session interface.

6. The method as claimed in claim 2, further comprising entering in the route table a gateway IP address for the DNS server address.

7. The system as claimed in claim 2, further comprising entering in the route table a mask of 255.255.255.255 creating a host entry.

8. The system as claimed in claim 1, further comprising connecting the data processing system to multiple sessions.

9. The method as claimed in claim 1, further comprising using the route table by the alternative application to route the requests to the correct session.

10. The method as claimed in claim 1, wherein the alternative address is administrable.

11. The method as claimed in claim 1, wherein an unsolicited DHCP inform message is discarded.

12. The method as claimed in claim 1, wherein the interceptor program and the alternate application are separate programs.

13. The method as claimed in claim 1, wherein the alternate application forwards only a first positive acknowledgement for a request.

14. The method as claimed in claim 1, wherein the alternate application discards only a negative acknowledgement for a request.

15. The method as claimed in claim 1, wherein the IPCP message has a plurality of DNS server addresses, wherein each of the plurality of DNS server addresses is stored and replaced.

16. A system for resolving a domain name resolution request, comprising:
a data processing system and a network;
a plurality of IPCP messages each containing a DNS (Domain Name Service) server address communicated between said data processing system and said network during a PPP (Point-To-Point Protocol) initialization; and
an interceptor program stored on the data processing system, for each IPCP message the interceptor program when executed on a processor the data processing system:
intercepts the respective IPCP message,
stores in the data processing system the DNS server address for the respective IPCP message, and
replaces the DNS server address in the respective IPCP message with an alternative address,
wherein the interceptor program intercepts a domain name resolution request and substantially simultaneously sends said request to each DNS server for which an address was stored.

17. The system as claimed in claim 16, further comprising adding intelligent routing information to a route table.

18. The system as claimed in claim 17, further comprising entering in the route table the DNS server address, a high priority metric value, an interface identifying a session interface, a gateway IP address, and a host entry mask.

19. The system as claimed in claim 16, further comprising connecting the data processing system to multiple sessions.

20. The system as claimed in claim 16, wherein the interceptor program comprises multiple programs.

21. The system as claimed in claim 16, wherein a plurality of domain name resolution requests are sent substantially simultaneously to said network.

22. The system as claimed in claim 16, wherein the respective IPCP message has a plurality of DNS server addresses, wherein each of the plurality of DNS server addresses is stored and replaced.

23. A method for resolving a domain name resolution request in a communications system including a data processing system, and a network, comprising:
by the data processing system:
initializing a Point-To-Point Protocol connection between the data processing system and the network for establishing a session;
during said initialization intercepting a plurality of messages from the network by, each message containing a Domain Name Service server address,
for each message, storing said Domain Name Service server address from the respective message, and replacing said DNS server address in the respective message with an alternative address;
resolving said domain name resolution request by sending the request to said stored addresses substantially simultaneously; and
receiving a resolved IP address.

24. The method as claimed in claim 23, wherein the respective message has a plurality of DNS server addresses, wherein each of the plurality of DNS server addresses is stored and replaced.

* * * * *